US007637248B2

(12) United States Patent
Naegele et al.

(10) Patent No.: US 7,637,248 B2
(45) Date of Patent: Dec. 29, 2009

(54) METHOD FOR OPERATING AN INTERNAL COMBUSTION ENGINE BY DETERMINING AND COUNTERACTING A PRE-IGNITION STATE

(75) Inventors: Claus Naegele, Stuttgart (DE); Hans Nickel, Weissach i. T. (DE); Bärbel Nickel, legal representative, Weissach i. T. (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 12/017,518

(22) Filed: Jan. 22, 2008

(65) Prior Publication Data

US 2008/0178844 A1 Jul. 31, 2008

(30) Foreign Application Priority Data

Jan. 25, 2007 (DE) ....................... 10 2007 003 864

(51) Int. Cl.
*F02P 5/00* (2006.01)
*G06F 19/00* (2006.01)
*G06G 7/70* (2006.01)

(52) U.S. Cl. ................................. 123/406.37; 701/111

(58) Field of Classification Search .................. 123/436
See application file for complete search history.

(56) References Cited

U.S. PATENT DOCUMENTS

| | | | | | |
|---|---|---|---|---|---|
| 4,002,155 | A | * | 1/1977 | Harned et al. | 123/406.39 |
| 4,120,272 | A | * | 10/1978 | Douaud et al. | 123/406.39 |
| 4,257,373 | A | * | 3/1981 | McDougal et al. | 123/406.2 |
| 4,269,154 | A | * | 5/1981 | Iwata et al. | 123/406.35 |
| 4,366,793 | A | * | 1/1983 | Coles | 123/436 |
| 4,388,902 | A | * | 6/1983 | Latapie | 123/406.21 |
| 4,461,257 | A | * | 7/1984 | Hosaka et al. | 123/406.24 |
| 5,134,980 | A | * | 8/1992 | Sakakibara et al. | 123/406.38 |
| 5,526,788 | A | | 6/1996 | Noble et al. | |
| 5,775,299 | A | * | 7/1998 | Ito et al. | 123/436 |
| 5,778,857 | A | * | 7/1998 | Nakamura et al. | 123/406.37 |
| 6,067,956 | A | * | 5/2000 | Motose et al. | 123/305 |
| 6,286,482 | B1 | * | 9/2001 | Flynn et al. | 123/435 |
| 6,993,427 | B2 | * | 1/2006 | Ueda | 701/111 |
| 7,040,282 | B2 | * | 5/2006 | Andersson et al. | 123/335 |
| 7,121,255 | B2 | * | 10/2006 | Liu et al. | 123/305 |
| 7,367,308 | B2 | * | 5/2008 | Kuo et al. | 123/295 |
| 7,367,313 | B2 | * | 5/2008 | Chang et al. | 123/305 |
| 2007/0150165 | A1 | * | 6/2007 | Saikkonen et al. | 701/104 |

(Continued)

FOREIGN PATENT DOCUMENTS

GB 2237388 A * 5/1991

(Continued)

*Primary Examiner*—Stephen K Cronin
*Assistant Examiner*—David Hamaoui
(74) *Attorney, Agent, or Firm*—Gudrun E. Huckett

(57) ABSTRACT

In a method for operating an internal combustion engine, wherein the internal combustion engine has a cylinder in which a combustion chamber is provided that is delimited by a reciprocating piston guided in the cylinder, wherein the piston is connected by a connecting rod to a crankshaft and wherein the internal combustion engine has a device for supplying fuel and a device for igniting the fuel/air mixture in the combustion chamber at least one engine speed value of the internal combustion engine is determined and evaluated. A pre-ignition state of the internal combustion engine is determined based on the result of the evaluation step.

12 Claims, 5 Drawing Sheets

U.S. PATENT DOCUMENTS

| | | | | |
|---|---|---|---|---|
| 2007/0151542 | A1 * | 7/2007 | Yamaguchi et al. | 123/299 |
| 2007/0261671 | A1 * | 11/2007 | Nakagawa et al. | 123/435 |
| 2008/0011273 | A1 * | 1/2008 | Birkner et al. | 123/435 |
| 2008/0017168 | A1 * | 1/2008 | DeGroot et al. | 123/436 |
| 2008/0078361 | A1 * | 4/2008 | Matthews et al. | 123/436 |
| 2008/0127945 | A1 * | 6/2008 | Hagel et al. | 123/501 |

FOREIGN PATENT DOCUMENTS

| | | | | |
|---|---|---|---|---|
| JP | 05256236 | A | * | 10/1993 |
| JP | 2003314421 | A | * | 11/2003 |

* cited by examiner

METHOD FOR OPERATING AN INTERNAL COMBUSTION ENGINE BY DETERMINING AND COUNTERACTING A PRE-IGNITION STATE

BACKGROUND OF THE INVENTION

The invention relates to a method for operating an internal combustion engine in which a glow ignition state (pre-ignition state) of the internal combustion engine is determined. The internal combustion engine comprises a cylinder in which a combustion chamber is provided that is delimited by a reciprocating piston guided in the cylinder wherein the piston is connected by a connecting rod to a crankshaft and wherein the internal combustion engine has a device for supplying fuel and a device for igniting the fuel/air mixture in the combustion chamber.

U.S. Pat. No. 5,526,788 discloses a method for determining a glow ignition state (pre-ignition state) of the internal combustion engine. In this method, the spark plug is utilized for determining the pre-ignition state. For this purpose, the current supply to the spark plug is measured and evaluated. This requires a comparatively complex electronic evaluation circuit.

SUMMARY OF THE INVENTION

It is an object of the present invention to provide a method for operating an internal combustion engine, in which engine a pre-ignition state of the internal combustion engine is determined, which method enables a simple and fast determination of the pre-ignition state.

In accordance with the present invention, this is achieved in that for the detection of the pre-ignition state of the engine at least one engine speed value of the internal combustion engine is determined and evaluated.

It has been found that the engine speed curve of an internal combustion engine in the pre-ignition state is more uniform than in the case of normal foreign-fired combustion. For determining in accordance with the present invention a pre-ignition state, this difference in the engine speed curve of the internal combustion engine is utilized. The engine speed can be determined in a simple way, for example, by means of an alternator that is arranged on the crankshaft of the internal combustion engine. Engine speed detection is conventionally performed anyway because the engine speed information is required for engine control of the internal combustion engine. Accordingly, no additional sensors or circuits at the spark plug are required.

Advantageously, an indicator for the pre-ignition state is determined by evaluating the engine speed value. In order to determine an indicator for a pre-ignition state, a simple evaluation of the engine speed signal is sufficient so that the control unit that performs the evaluation can be of a simple design. In particular, when an indicator points to a pre-ignition state, the ignition of the internal combustion engine is interrupted and the course of engine speed of the internal combustion engine with interrupted ignition is determined. The engine speed curve for interrupted ignition is characteristic with regard to whether a pre-ignition state is present or not. When the engine speed drops upon interrupting of ignition, normal operation is present. When the engine speed remains constant despite interrupted ignition, this means that combustion is still taking place, i.e., the mixture auto-ignites. This indicates a pre-ignition state. Accordingly, it can be determined in a simple way whether, in fact, a pre-ignition state is present. Advantageously the ignition is interrupted for several engine cycles in order to obtain a significant engine speed reaction.

Advantageously the engine speed differential between sequential engine cycles is determined as an engine speed value. In this connection, in particular the engine speed of a complete engine cycle is considered. Engine speed fluctuations within an engine cycle advantageously do not affect the determination of the engine speed differential. However, it can also be provided that the engine speed differential is determined based on the engine speed at a certain point in time of the engine cycle. It is provided that the engine speed differential is compared to an engine speed differential limit value. Because of uniform engine operation, the engine speed differential for a pre-ignition state is significantly less than the engine speed differential for normal operation. However, since in normal operation several engine cycles with substantially constant engine speed may occur also, it is provided that the result of the comparison of engine speed differential and engine speed differential limit value are evaluated for several engine cycles.

The evaluation of the comparative result can be realized in a simple way by means of a counter that is increased when the engine speed differential is smaller than the engine speed differential limit value and that is lowered when the engine speed differential is greater than the engine speed differential limit value. The counter thus provides an indicator for the number of engine cycles with great engine speed fluctuation relative to engine cycles with minimal engine speed fluctuation. It is provided that the counter is compared to a counter limit value reaching the counter limit indicates the presence of the pre-ignition state. The counter is expediently reset to its initial value after reaching the counter limit value.

Pre-ignition occurs in internal combustion engines only within a certain engine speed range above a minimum and below a maximum engine speed. It is therefore provided that monitoring is carried out in regard to whether the engine speed is in an engine speed range in which pre-ignition can occur and that the counter is reset to an initial value when the engine speed is outside of the engine speed range.

In the engine speed range in which pre-ignition can occur, not only the engine speed differential between sequential engine cycles in a pre-ignition state is minimal but also the standard deviation of the engine speed. For detecting the pre-ignition state of the internal combustion engine, it is proposed to determine whether the engine speed is within an engine speed range in which pre-ignition can occur. When the engine speed is within this engine speed range, it is provided that for detecting the pre-ignition state the standard deviation of the engine speed is determined. Based on the standard deviation of the engine speed, the existence of the pre-ignition state can be directly determined. In this connection, in particular the standard deviation of the engine speed of a complete engine cycle is determined. Engine speed fluctuations within an engine speed cycle are advantageously not taken into account. In particular, the standard deviation is compared to a limit value for the standard deviation wherein, when dropping below the limit value a pre-ignition state is present. When comparing the standard deviation with the limit value for the standard deviation, the presence of a pre-ignition state can be directly determined. It can also be provided that additionally the ignition is interrupted and the engine speed reaction is determined in order to make sure that the pre-ignition state is in fact present. This is in particular expedient when the limit value for the standard deviation is close to standard deviations that occur in normal engine operation.

Advantageously a mean engine speed is determined as an engine speed value. A mean engine speed can be determined in a simple way. The mean engine speed provides information in regard to the engine speed level of the internal combustion engine. Advantageously, the internal combustion engine is an engine in which the engine speed is limited by interrupting the ignition of the internal combustion engine. An engine speed limitation by interrupting the ignition is in particular provided in internal combustion engines that are used in hand-held power tools such as hedge trimmers or cut-off machines that regularly operate within the range of the cut-off engine speed. In these power tools, the ignition is interrupted regularly in operation. The resulting engine speed curve in the area of the cut-off engine speed can be utilized in a simple way for determining a pre-ignition state. For example, this can be done by determining the mean engine speed. A pre-ignition state is present when this mean engine speed is above the cut-off engine speed by a preset value. Above the cut-off engine speed, the engine speed differential between two sequential engine cycles can however be used also for determining the pre-ignition state. When the engine speed increases between two engine cycles by more than the predetermined limit value for the engine speed increase, a pre-ignition state exists because the ignition of the engine is interrupted and, without pre-ignition being present, only a minimal engine speed increase or an engine speed drop would be possible.

Advantageously, by comparing the engine speed value with a limit value for this engine speed it is determined directly whether a pre-ignition state exists. This is possible in that the engine speed value, determined for an internal combustion engine where the engine speed is limited by interrupting the ignition, can already take into account the engine speed development after interrupting the ignition. In this way, the pre-ignition state can be determined in a simple way.

When a pre-ignition state has been detected, it is provided that measures are initiated that counteract pre-ignition. Advantageously, an increased amount of fuel is applied to the internal combustion engine in order to terminate the pre-ignition state. It can also be provided that the fuel supply is greatly reduced or interrupted in order to end the pre-ignition state.

DESCRIPTION OF THE PREFERRED EMBODIMENTS

Figure 1:
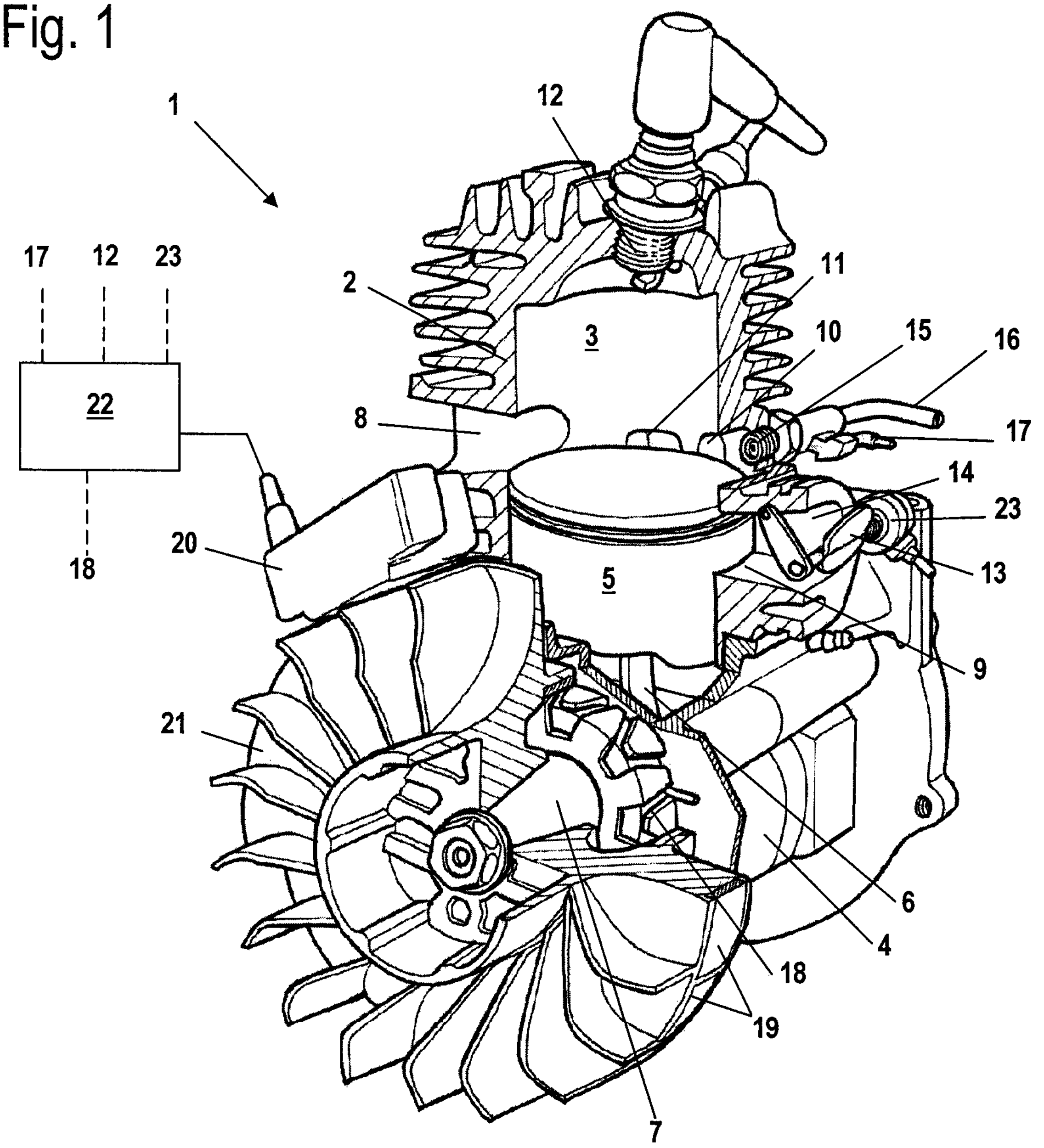
FIG. 1 is a schematic, perspective and partially sectioned illustration of an internal combustion engine.

The internal combustion engine 1 illustrated in FIG. 1 is a single cylinder engine. The internal combustion engine 1 is a two-stroke engine that is provided in particular for driving a tool of a hand-held power tool such as a motor chainsaw, a cut-off machine, a trimmer or the like. The method according to the invention can also be used in a four-stroke engine. The internal combustion engine 1 comprises a cylinder 2 in which a combustion chamber 3 is provided. The combustion chamber 3 is delimited by a piston 5 supported so as to reciprocate within the cylinder 2. By means of a connecting rod 6, the piston 5 drives in rotation a crankshaft 7 rotatably supported in the crankcase 4. A fan wheel 21 is fixedly connected to the crankshaft 7. The fan wheel 21 supports the pole shoes 19 that generate in an ignition module 20 arranged at the circumference of the fan wheel 21 a voltage for a spark plug. In the area of the fan wheel 21 an alternator 18 is arranged on the crankshaft 7. It can also be provided that the alternator 18 generates voltage for generating a spark. The alternator 18 provides also a signal based on which the engine speed of the internal combustion engine 1 can be determined.

The internal combustion engine 1 has an intake 9 that opens at the cylinder 2 and communicates with the crankcase 4 when the piston 5 is at top dead center. Through the intake 9 combustion air is sucked into the crankcase 4. The intake 9 is connected to an intake passage 14. A throttle 13 is pivotably supported in the intake passage 14. A throttle sensor 23 that detects the rotational position of the throttle 13 is provided on the throttle 13.

An exhaust 8 is connected to the combustion chamber 3. The crankcase 4 communicates at bottom dead center of the piston 5 by means of two transfer passages 10 near the intake and two transfer passages 11 near the exhaust to the combustion chamber 3. In FIG. 1, one of the transfer passages 10 and 11 is illustrated, respectively. The two other transfer passages 10 and 11 are symmetrically arranged thereto. A valve 15 opens into the transfer passage 10 near the intake and supplies fuel to the transfer passage 10. The valve 15 is connected by fuel line 16 to a fuel tank (not illustrated). The valve 15 has a control line 17 that is connected to a control unit 22 of the internal combustion engine 1. By means of the control unit 22, the alternator 18 and the throttle sensor 23 are connected also to the control unit 22. A spark plug 12 projects into the combustion chamber 3 and is also connected to the control unit 22. The control unit 22 is also connected to the ignition module 20. The control unit 22 can also be integrated into the ignition module 20. The spark plug 12 and the ignition module 20 together provide the ignition device of the internal combustion engine 1.

In operation of the internal combustion engine 1, the upward stroke of the piston 5 causes combustion air to be sucked in from the intake passage 14 through the intake 9 into the crankcase 4. The downward stroke of the piston 5 causes the combustion air to be compressed in the crankcase 4. The downwardly moving piston 5 opens the transfer passages 10 and 11 so that the combustion air can flow out of the crankcase 4 into the combustion chamber 3. The valve 15 meters fuel into the air flowing into the combustion chamber 3. The valve 15 can also meter fuel into the crankcase 4 when the transfer passages 10 and 11 are closed relative to the combustion chamber 3. In this way, lubrication of the crankcase 4 can be achieved. In the combustion chamber 3, the combustion air and the fuel generate the fuel/air mixture that is compressed by the upwardly moving piston 5 and is ignited at top dead center of the piston 5 by the spark plug 12. Combustion accelerates the piston 5 in the direction toward the crankcase 4. The downwardly moving piston 5 opens the exhaust 8 so that exhaust gases can exit through the exhaust 8 into the muffler arranged at the internal combustion engine 1.

Pre-ignition can occur during operation of the internal combustion engine 1. In this case, the fuel/air mixture is pre-ignited in the combustion chamber 3 before a spark is generated by the spark plug 12. Upon pre-ignition very high temperatures and pressures in the combustion chamber 3 are created. This causes very high mechanical and thermal loads to act on the internal combustion engine 1. Therefore, the glow ignition state is undesirable.

Figure 2:
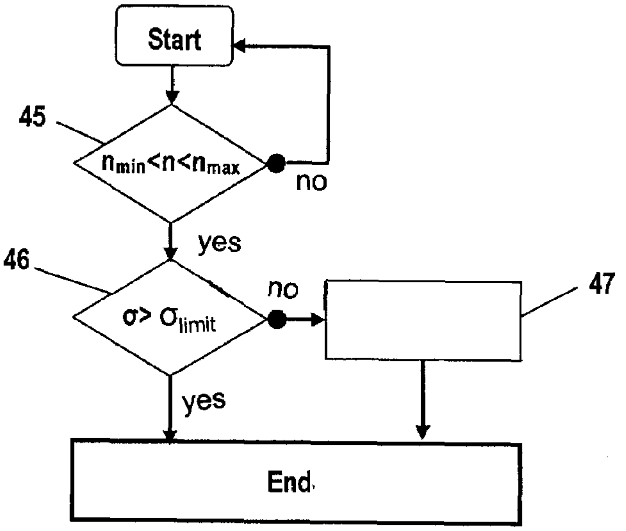
FIG. 2 is a flowchart for performing the method according to the present invention.

In FIG. 2, a method for determining the glow ignition state and for terminating the glow ignition state are shown. For this purpose, the engine speed n of a complete engine cycle is detected. One engine cycle for a two-stroke engine corresponds to the entire revolution of the crankshaft while in the case of a four-stroke engine an engine cycle comprises two revolutions of the crankshaft. In method step 45 it is first checked whether the determined engine speed n is above a lower engine speed $n_{min}$ and below an upper engine speed $n_{max}$. In conventional internal combustion engines glow ignition can occur only within a certain engine speed range near the nominal engine speed. The lower engine speed limit $n_{min}$ can be at approximately 10,000 rpm (revolution per minute). The upper engine speed limit can be, for examples at approximately 14,000 rpm. The engine speed limits $n_{min}$ and $n_{max}$ are to be selected within a suitable range for each internal combustion engine. When the momentary engine speed is not within the engine speed range, no pre-ignition state can be present. The method is thus terminated for these engine cycles.

When the measured engine speed n is within the engine speed range, the standard deviation σ is determined in the method step 46. For determining the standard deviation σ of the engine speed n, it is necessary to save a plurality of engine speed values. The standard deviation σ is compared with limit value art for the standard deviation. When the standard deviation σ is above the limit value $\sigma_{limit}$ for the standard deviation, no glow ignition state is present. The method run is terminated.

When the standard deviation σ is smaller or identical to the limit value $\sigma_{limit}$ for the standard deviation, a glow ignition state is present. In the method step 47 measures are therefore undertaken for terminating the glow ignition state. For this purpose, particularly via the valve 15, additional fuel is supplied which then causes the mixture to be enriched in the combustion chamber 3. Enriching the mixture prevents pre-ignition.

When the limit value $\sigma_{limit}$ for the standard deviation is near the standard deviation that exists for normal operating states, in the method step 47 it can first be provided that the ignition of the internal combustion engine is interrupted and the engine speed reaction of the internal combustion engine 1 is monitored. When the engine speed n of the internal combustion engine 1 drops after interrupting ignition, no pre-ignition state is present; normal operation exists. When the engine speed n after interrupting the ignition remains substantially constant, pre-ignition exists.

Figure 3:
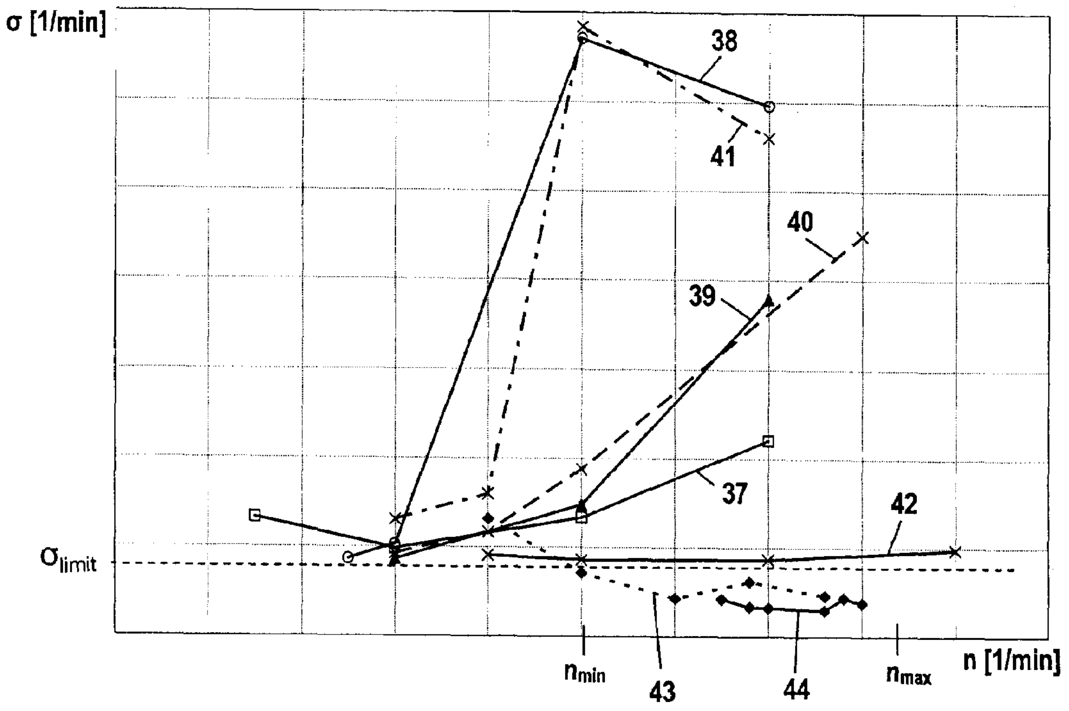
FIG. 3 is a diagram showing the standard deviation curve of the engine speed as a function of the engine speed for different motor states.

In FIG. 3 the curve of the standard deviation is plotted for different operating states of the internal combustion engine 1 as a function of the engine speed n. The curves 37 to 42 show the standard deviation σ in normal operation of the engine while the curves 43 and 44 show pre-ignition states of the internal combustion engine 1. The curves 37 to 39 show the curve of the standard deviation σ under partial load wherein the curve 37 illustrates low partial load, the curve 38 illustrates medium partial load, and the curve 39 illustrates upper partial load. In the low partial load range the throttle 13 is approximately half open. For average and upper partial load, the throttle 13 is accordingly opened father. The curve 42 shows the curve of the standard deviation σ at full load, i.e., for a completely open throttle 13. At full load, the standard deviation σ is slightly above a limit value $\sigma_{limit}$ for the standard deviation. The curve 42 indicates the course of the standard deviation σ at optimally adjusted fuel/air ratio. The curve 40 shows the course of the standard deviation σ at full load for a lean fuel/air mixture; the curve 41 shows the course of the standard deviation σ at full load for a fuel/air mixture that is too rich. As shown in FIG. 3 in normal operation the resulting standard deviations σ for different load states and for a wide range of engine speed are above the limit value $\sigma_{limit}$ for the standard deviation σ.

The curve 43 shows the course of the standard deviation σ when running up the internal combustion engine in a pre-ignition state. The standard deviation a drops with increasing engine speed n wherein the standard deviation σ, approximately starting at the lower engine speed $n_{min}$, is below the limit value $\sigma_{limit}$ for the standard deviation σ. The curve 44 shows the course of the standard deviation σ for normal operation at pre-ignition (glow ignition) state. The resulting standard deviation σ is also below the limit value $\sigma_{limit}$ for the standard deviation α.

As shown in FIG. 3, the standard deviation σ in the engine speed range from the lower engine speed $n_{min}$ to the upper engine speed $n_{max}$ is a parameter that indicates whether a pre-ignition state exists or not.

Figure 4:
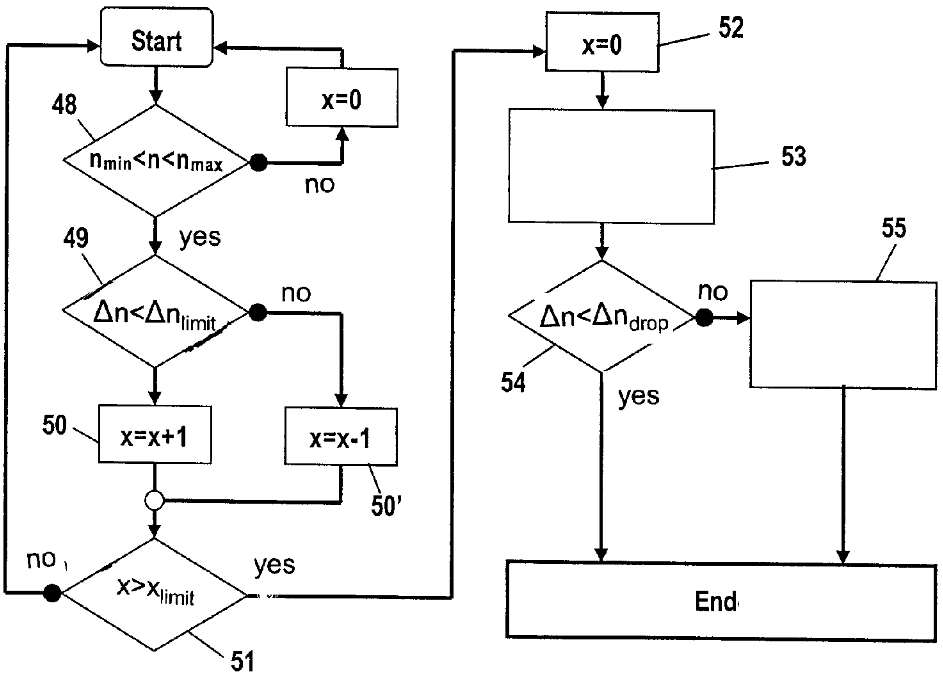
FIG. 4 is a flowchart for performing one embodiment of the method according to the present invention.

One embodiment of the method is illustrated in FIG. 4. In the method according to FIG. 4, it is first checked in the method step 48 whether the engine speed n is within a predetermined engine speed range between a lower engine speed $n_{min}$ and an upper engine speed $n_{max}$. Only within this engine speed range between the lower and the upper engine speeds, glow ignition can occur. When the engine speed n is not within the engine speed range, a counter x is reset to an initial value, i.e., to zero. In this way, it is ensured that the counter x, when the engine speed n passes into the engine speed range, begins to count anew. The engine speed n is in particular the engine speed of a complete engine cycle. Engine speed fluctuations within an engine cycle are advantageously not taken into account.

When the engine speed n is within the engine speed range between the lower engine speed $n_{min}$ and the upper engine speed $n_{max}$, it is checked in the method step 49 whether the engine speed differential Δn of the actual engine speed to the engine speed of the preceding engine cycle is smaller than an engine speed differential limit value $\Delta n_{limit}$. When the engine speed differential Δn is smaller than the engine speed differential limit value $\Delta n_{limit}$, the counter is increased by 1 in method step 50. A smaller engine speed differential Δn indicates smooth running of the internal combustion engine 1 so that a glow ignition state can be present. When the engine speed differential Δn is greater than the engine speed differential limit value $\Delta n_{limit}$, the counter x is reduced by 1 in the method step 50'. Subsequently, it is checked in the method step 51 whether the counter x is above or below a counter limit value $x_{limit}$. When the counter is below the limit value, the method is started again. When the counter x is above the counter limit value $x_{limit}$, this is an indicator that a glow ignition state is present.

Subsequently, in the method step 52 first the counter x is reset to its initial value, i.e., reset to zero. In the method step 53 the ignition of the internal combustion engine 1 is then interrupted and the subsequent engine speed course is determined. Advantageously, the engine speed differential Δn between sequential engine cycles is then also evaluated. In the method step 54, it is checked whether the engine speed differential Δn is smaller than a limit value for the engine speed drop $\Delta n_{drop}$. When the engine speed differential Δn is greater, this means that the engine speed n after interruption of the ignition has dropped comparatively strongly. This means that no pre-ignition is present. The method is terminated.

When the engine speed differential Δn is greater than the limit value for the engine speed drop $\Delta n_{drop}$, a pre-ignition state is present. In the method step 55 measures for preventing pre-ignition are therefore initiated. In particular, an increased amount of fuel is supplied in order to enrich the mixture. In this way, the pre-ignition state can be canceled. The internal combustion engine then runs again in normal operation.

Figure 5:
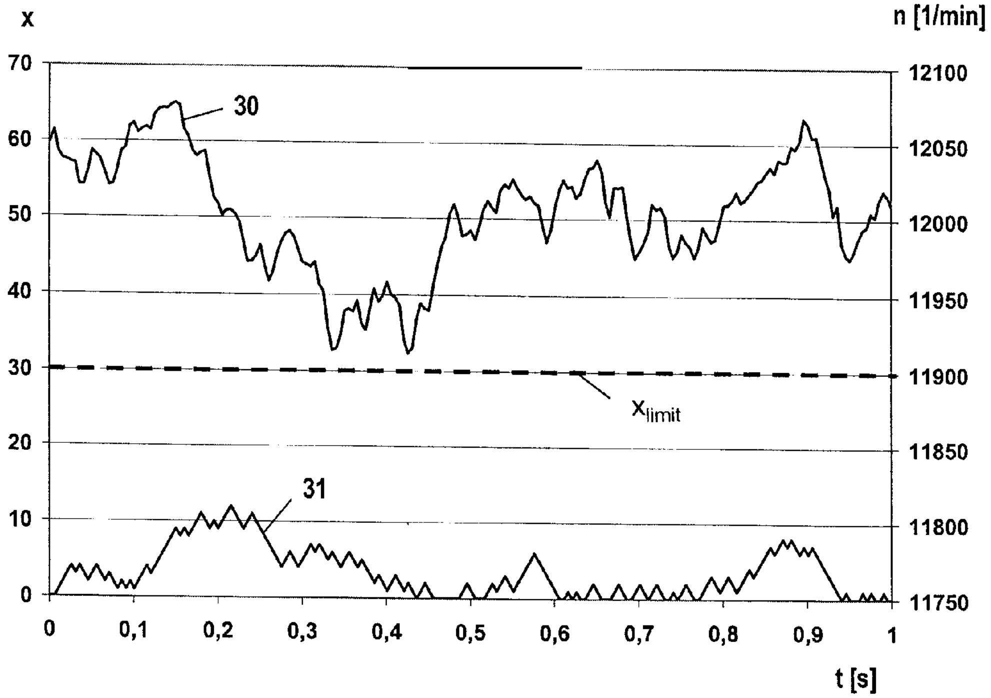
FIG. 5 is a diagram showing the engine speed curve and the course of a counter in normal operation of the engine.
Figure 6:
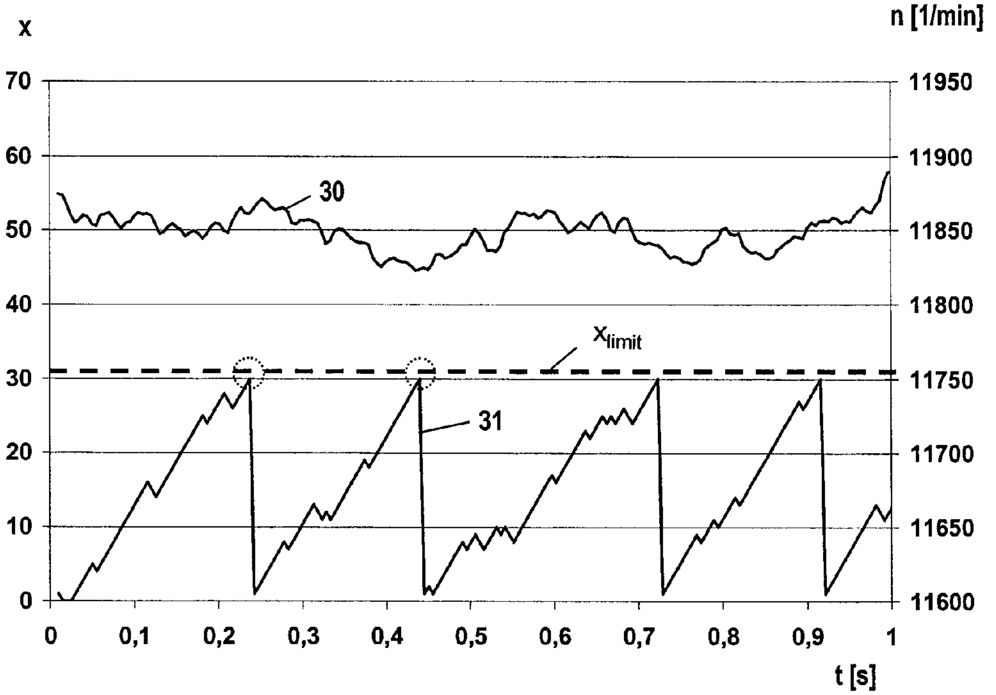
FIG. 6 is a diagram showing the engine speed curve and the course of the counter for a pre-ignition state of the internal combustion engine.

In the FIGS. 5 and 6 the engine speed curve and the curve of the counter x in normal operation (FIG. 5) and pre-ignition operation (FIG. 6) are plotted over time t. The curve 30 illustrates the engine speed n and the curve 31 illustrates the counter x. As shown in FIG. 5, in normal operation the fluctuation of the engine speed n is comparatively high. The counter x is increased and lowered so that a zigzag-shaped course of the curve 31 results. The counter x thus remains far below the counter limit value $x_{limit}$. The counter limit value $x_{limit}$ can be, for example, 30. The counter limit value $x_{limit}$ is to be selected appropriately for each internal combustion engine.

In FIG. 6 the course of the engine speed for a pre-ignition state is shown. The fluctuation of the engine speed n from engine cycle to next engine cycle is comparatively minimal. Accordingly, the engine speed differential Δn of the engine speed of sequential engine cycles in most cycles is below the engine speed differential limit value $\Delta n_{limit}$ so that the counter x for most of the engine cycles is increased. As shown in the diagram of FIG. 6, the curve for the counter x increases very steeply and reaches the counter limit value $x_{limit}$ already after 0.2 to 0.3 seconds.

Figure 7:
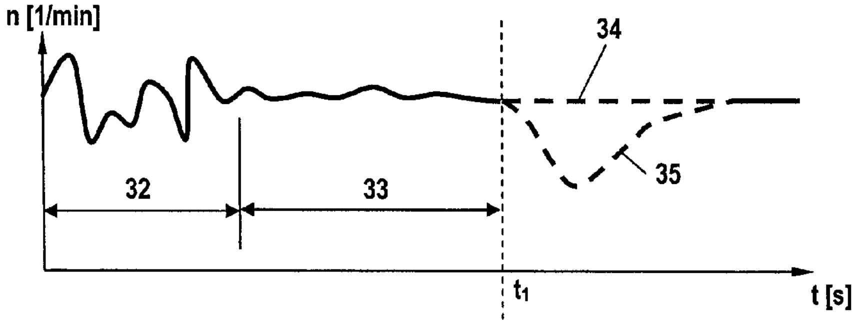
FIG. 7 shows the engine speed curve over time.
Figure 8:
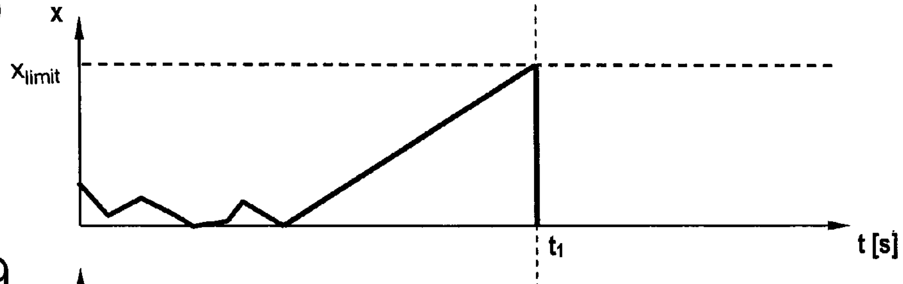
FIG. 8 shows the course of the counter over time for the engine speed curve of FIG. 7.
Figure 9:
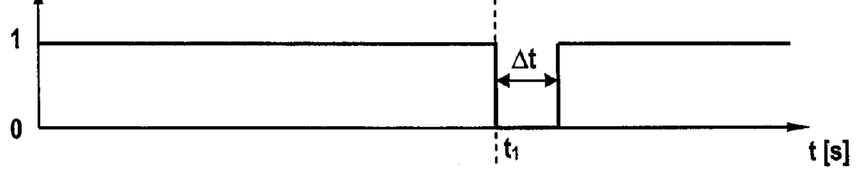
FIG. 9 is a diagram showing the ignition as a function of time for the engine speed curve of FIG. 7 and the course of the counter as illustrated in FIG. 8.

In FIGS. 7 to 9, the method according to the invention is illustrated in detail. In FIG. 7 the course of the engine speed n over time t is illustrated. In the range 32 normal operation exists. The engine speed n fluctuates from engine cycle to next engine cycle comparatively strongly. In the range 33 the engine speed fluctuations are only very minimal. As shown in FIG. 8, this has the result that the counter x increases quickly and reaches the counter limit value $x_{limit}$ at time $t_1$. In order to ensure that in the range 33 pre-ignition exists in fact, at time $t_1$—as shown in FIG. 9—the ignition is interrupted for time period Δt. The time period Δt includes advantageously several engines cycles. The engine speed curve of this time period Δt is evaluated.

FIG. 7 shows the two possibilities of the engine speed curve. The curve 34 shows the engine speed curve for glow ignition operation. The engine speed n of the internal combustion engine 1 does not drop when interrupting ignition at the point in time $t_1$. The engine speed n remains approximately unchanged. In this case glow ignition operation exists because ignition of the mixture takes place despite the ignition having been interrupted. The curve 35 shows the engine speed curve in normal operation. When interrupting ignition, the engine speed n drops strongly in normal operation because no combustion takes place any longer and the piston 5 is no longer accelerated. Only upon starting the ignition again, the engine speed n increases again. Based on the engine speed curve it can therefore be determined safely whether glow ignition operation exists. Because the ignition is only interrupted when actually there are signs of the existence of glow ignition operation, the ignition is not excessively interrupted so that running of the internal combustion engine 1 is not affected excessively by interrupting the ignition.

By means of the method according to the invention, it is possible in a simple way, essentially by detecting the engine speed of the internal combustion engine 1, to determine whether a pre-ignition state is present. The method illustrated in FIG. 4 has moreover the advantage that only a few parameters must be saved, i.e., the actual engine speed n as well as the engine speed n of the preceding engine cycle for determining the engine speed differential Δn as well as the actual value for the counter x. In this way, a simple configuration of the control unit is possible.

Figure 10:
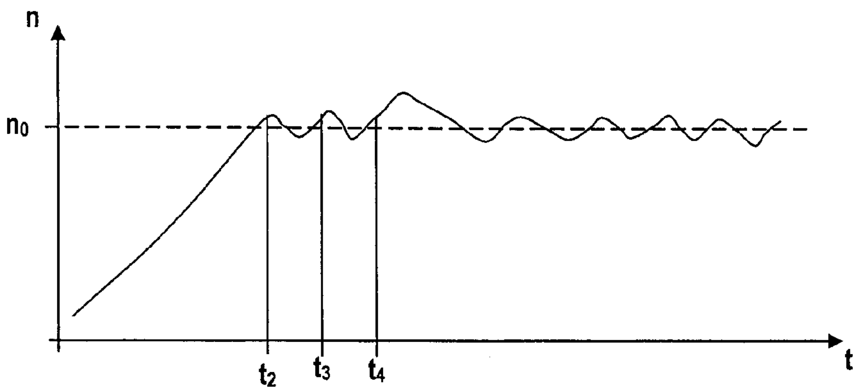
FIG. 10 is a diagram showing the engine speed curve of an internal combustion engine in the range of the cut-off engine speed.

Power tools such as motor chainsaws or the like are usually operated significantly below a cutoff engine speed of the internal combustion engine. Accordingly, in the internal combustion engines of such power tools there occurs only rarely an interruption of the ignition. Other power tools such as trimmers or hedge trimmers are usually operated in the range of the cut-off engine speed. The engine speed control is usually performed by interrupting the ignition above a cut-off engine speed $n_0$, as shown in FIG. 10. FIG. 10 shows a schematic engine speed curve of an internal combustion engine of a power tool in which the internal combustion engine 1 operates in the range of the cut-off engine speed $n_0$. At a point in time $t_2$, the engine speed n surpasses the cut-off engine speed $n_0$. The ignition is interrupted and the engine speed n drops below the cut-off engine speed $n_0$. Accordingly the engine speed n increases again above the cut-off engine speed $n_0$ which leads at the point in time $t_3$ to another interruption of the ignition and to a subsequent drop of the engine speed. At the point in time $t_4$ the ignition is again interrupted. The engine speed n that is greater than the cut-off engine speed $n_0$ however does not drop but increases further. This indicates a glow ignition state. This glow ignition state can be detected and the engine speed n can be reduced by appropriate measures such as increasing the fuel supply or reducing or switching off the fuel supply.

Figure 11:
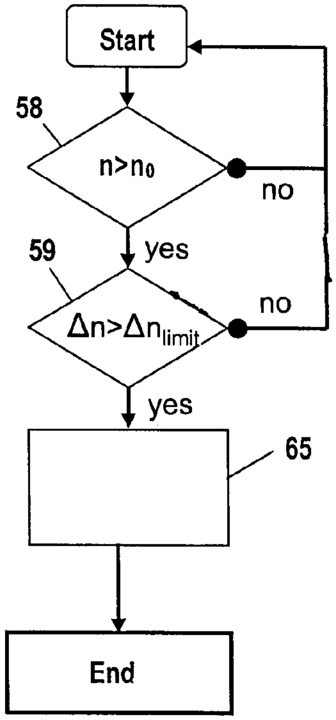
FIG. 11 shows a flowchart for performing another embodiment of the method according to the invention.

FIG. 11 shows a first course of a method for determining a glow ignition state. In the method step 58 it is determined whether the engine speed is above the cut-off engine speed $n_0$. If this is not the case, the method is restarted because below the cut-off engine speed $n_0$ it is not possible that a pre-ignition state exists.

When the engine speed n is greater than the cut-off engine speed $n_0$, it is checked in method step 59 whether the engine speed differential Δn between two sequential engine cycles is greater than an engine speed differential limit value $\Delta n_{limit}$. In this connection, the engine speed differential Δn for several engine cycles, for example, between the first and the fifth engine cycles, can be utilized. When the engine speed differential Δn is smaller than the engine speed differential limit value $\Delta n_{limit}$, no pre-ignition state is present. This can be the case when the engine speed n essentially remains constant or when the engine speed n drops. When the engine speed differential Δn is greater than the engine speed differential limit value $\Delta n_{limit}$, a pre-ignition state is present. In the method step 65 measures are therefore initiated against pre-ignition of the internal combustion engine. This can be enriching the fuel/air mixture, i.e., an increased fuel supply, or leaning the fuel/air mixture, i.e., reducing the fuel supply. When the engine speed n drops again below the cut-off engine speed $n_0$, the internal combustion engine 1 returns to normal proration.

Figure 12:
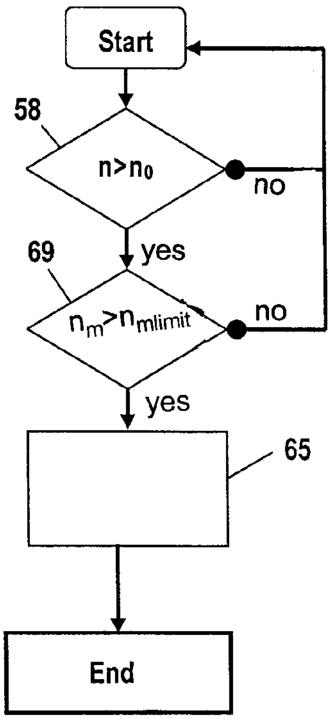
FIG. 12 shows a flowchart for performing yet another embodiment of the method according to the invention.

FIG. 12 shows a variant of the method. In the method step 58 it can be checked whether the engine speed n is greater than the cut-off engine speed $n_0$. However, this method step 58 can also be eliminated in method according to FIG. 12. In the method step 69 it is determined whether a mean engine speed $n_m$ is greater than a limit value $n_{limit}$ for the mean engine speed. The mean engine speed $n_m$ represents the mean of the engine speed n over several engine cycles. When the mean engine speed $n_m$ is smaller than the limit value $n_{mlimit}$ for the mean engine speed, no pre-ignition state is present. When the mean engine speed $n_m$ is greater than the limit value $n_{mlimit}$ for the mean engine speed, a pre-ignition state is present. In the method step 65 measures against pre-ignition are taken, such as enriching or leaning the fuel/air mixture supplied to the internal combustion engine.

The cut-off engine speed $n_0$ can be, for example, at approximate 12,500 rpm (revolutions per minute). The engine speed differential limit value $\Delta n_{limit}$, can be, for example, approximately 200 rpm and the limit value $n_{limit}$ for the mean engine speed can be, for example, at approximately 13,000 rpm. However, the engine speed values must be determined for each motor individually.

For internal combustion engines that in normal operation usually operate within the cut-off range, it is possible to determine directly by determining and evaluating at least one engine speed value whether a pre-ignition state is present or not. The prior detection of an indicator for a pre-ignition state is obsolete. In this way a simple detection of a pre-ignition state is possible.

The specification incorporates by reference the entire disclosure of German priority document 102007003864.1 having a filing date of Jan. 25, 2007.

While specific embodiments of the invention have been shown and described in detail to illustrate the inventive principles, it will be understood that the invention may be embodied otherwise without departing from such principles.

What is claimed is:

1. A method for operating an internal combustion engine, wherein the internal combustion engine has a cylinder in which a combustion chamber is provided that is delimited by a reciprocating piston guided in the cylinder, wherein the piston is connected by a connecting rod to a crankshaft and wherein the internal combustion engine has a device for supplying fuel and a device for igniting a fuel/air mixture in the combustion chamber, the method comprising the steps of:

a) determining at least one engine speed value of the internal combustion engine;

b) evaluating the at least one engine speed value; and c) determining a pre-ignition state of the internal combustion engine based on a result of step b), wherein the result of step b) provides an indicator for a pre-ignition state;

d) interrupting the ignition for the duration of several engine cycles when the indicator indicates a pre-ignition state and determining a course of the engine speed of the internal combustion engine while the ignition is interrupted.

2. The method according to claim 1, wherein the engine speed value is a mean engine speed value.

3. The method according to claim 1, further comprising the step of taking counter measures against the pre-ignition state when the pre-ignition state has been determined.

4. The method according to claim 3, wherein a fuel supply is increased to counteract the pre-ignition state.

5. The method according to claim 3, wherein a fuel supply is greatly decreased to counteract the pre-ignition state.

6. The method according to claim 3, wherein a fuel supply is stopped to counteract the pre-ignition state.

7. A method for operating an internal combustion engine, wherein the internal combustion engine has a cylinder in which a combustion chamber is provided that is delimited by a reciprocating piston guided in the cylinder, wherein the piston is connected by a connecting rod to a crankshaft and wherein the internal combustion engine has a device for supplying fuel and a device for igniting a fuel/air mixture in the combustion chamber, the method comprising:

in a first step, determining an indicator for a pre-ignition state by determining an engine speed differential of sequential engine cycles, comparing the engine speed differential to an engine speed differential limit value, and evaluating results of comparing the engine speed differential to the engine speed differential limit value of several engine cycles;

in a second step, when the presence of the indicator for the pre-ignition state is confirmed, determining the actual presence of a pre-ignition state.

8. The method according to claim 7, wherein in the first step a counter is increased when the engine speed differential is smaller than the engine speed differential limit value and the counter is decreased when the engine speed differential is greater than the engine speed differential limit value, wherein the counter is compared to a counter limit value and wherein the indicator indicates the pre-ignition state when the counter limit value is reached and wherein the counter is reset to zero after the counter limit value has been reached.

9. The method according to claim 8, further comprising the step of monitoring whether the engine speed is within an engine speed range in which pre-ignition is possible and wherein the counter is reset to an initial value when the engine speed is outside of the engine speed range.

10. The method according to claim 7, wherein in the second step the ignition of the combustion engine is interrupted and the course of the engine speed of the internal combustion engine is determined while the ignition of the combustion engine is interrupted.

11. A method for operating an internal combustion engine, wherein the internal combustion engine has a cylinder in which a combustion chamber is provided that is delimited by a reciprocating piston guided in the cylinder, wherein the piston is connected by a connecting rod to a crankshaft and wherein the internal combustion engine has a device for supplying fuel and a device for igniting a fuel/air mixture in the combustion chamber, the method comprising:

in a first step, determining an indicator for a pre-ignition state by determining whether the engine speed is within an engine speed range in which pre-ignition is possible; and in a second step, when in the first step it has been determined that the engine speed is within the engine speed range in which pre-ignition is possible, verifying that a pre-ignition state exists by determining a standard deviation of an engine speed, wherein the standard deviation of the engine speed is determined for a complete engine cycle, and wherein the standard deviation is compared to a standard deviation limit value, wherein the pre-ignition state exists when the standard deviation is below the standard deviation limit value.

12. A method for operating an internal combustion engine, wherein the internal combustion engine has a cylinder in which a combustion chamber is provided that is delimited by a reciprocating piston guided in the cylinder, wherein the piston is connected by a connecting rod to a crankshaft and wherein the internal combustion engine has a device for supplying fuel and a device for igniting a fuel/air mixture in the combustion chamber, wherein the internal combustion engine operates regularly within the range of the cut-off speed of the internal combustion engine and the engine speed of the internal combustion engine is limited by interrupting the ignition, the method comprising the steps of:

determining a pre-ignition state of the internal combustion engine by determining at least one engine speed value of the internal combustion engine in the range of the cut-off engine speed and comparing said at least one engine speed value with an engine speed limit value for said at least one engine speed value, wherein said at least one engine speed value is an engine speed differential of two engine cycles or a mean engine speed, wherein a pre-ignition state exists when said at least one engine speed value is greater than said engine speed limit value for said at least one engine speed value; and taking counter measures against the pre-ignition state when the pre-ignition state exists.

* * * * *